(12) United States Patent
Tateishi et al.

(10) Patent No.: US 7,755,820 B2
(45) Date of Patent: Jul. 13, 2010

(54) TWO-DIMENSIONAL MODULATION METHOD FOR HOLOGRAM RECORDING AND HOLOGRAM APPARATUS WITH ENCODER FOR DRIVING SLM DISPLAYING BOUNDARY PORTION

(75) Inventors: Kiyoshi Tateishi, Tsurugashima (JP); Michikazu Hashimoto, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 388 days.

(21) Appl. No.: 10/594,531

(22) PCT Filed: Mar. 15, 2005

(86) PCT No.: PCT/JP2005/005076

§ 371 (c)(1),
(2), (4) Date: Nov. 28, 2007

(87) PCT Pub. No.: WO2005/098830

PCT Pub. Date: Oct. 20, 2005

(65) Prior Publication Data

US 2008/0231925 A1    Sep. 25, 2008

(30) Foreign Application Priority Data

Mar. 30, 2004    (JP) .............................. 2004-098131

(51) Int. Cl.
*G02B 5/32* (2006.01)

(52) U.S. Cl. .............................. 359/21; 359/22; 359/30

(58) Field of Classification Search ..................... 359/1, 359/21, 22, 30
See application file for complete search history.

(56) References Cited

U.S. PATENT DOCUMENTS 5,995,251 A * 11/1999 Hesselink et al. ............. 359/30

FOREIGN PATENT DOCUMENTS

| JP | 49-3646 | 1/1974 |
|---|---|---|
| JP | 2000-123133 | 4/2000 |
| JP | 2005-31560 | 2/2005 |

* cited by examiner

*Primary Examiner*—Stephone B Allen
*Assistant Examiner*—Jennifer L. Doak
(74) *Attorney, Agent, or Firm*—Drinker Biddle & Reath LLP

(57) ABSTRACT

To provide a two-dimensional modulation method for hologram recording which is capable of preventing degradation of reconstructing performance when positional shift occurs and which enables information to be stably recorded or reproduced. The hologram recording carrier employs the two-dimensional modulation method for hologram recording for generating coherent light containing therein page data through a spatial light modulator having a plurality of pixels two-dimensionally arranged therein, in which the pixels of the spatial light modulator are partitioned into a plurality of blocks consisting of m pixels adjacent to each other (where m=an integral number), and a boundary portion which has a width having at least the width of one pixel of the spatial light modulator or of one pixel of an image detecting sensor used to reproduce the recorded page data and the distance between the adjacent pixels in each of the blocks, and each of which shields light is provided between the adjacent blocks.

5 Claims, 20 Drawing Sheets

FIG. 2   PRIOR ART
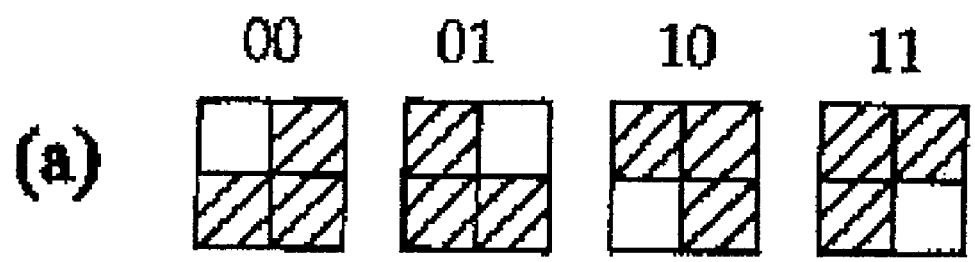
(b) 01001110 11011100 10100101 01010101
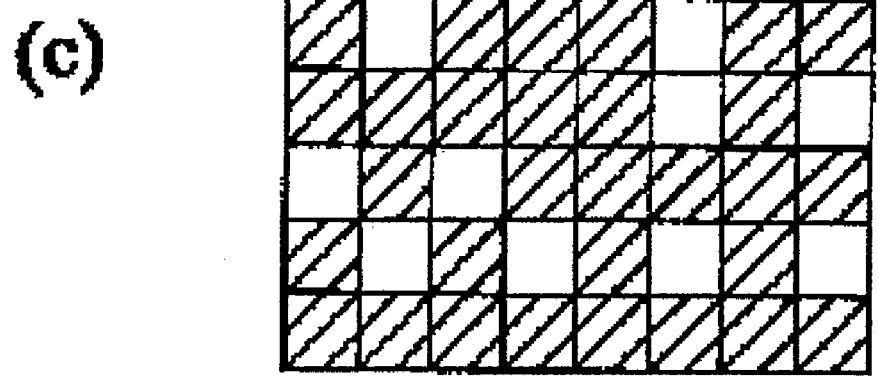

FIG. 12
OVERSAMPLING
1 BLOCK IN SPATIAL LIGHT MODULATOR
1 BLOCK IN IMAGE DETECTING SENSOR
SAMPLE (1) 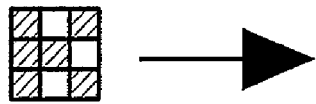 → 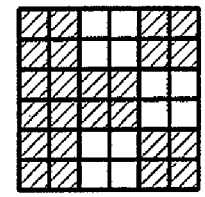
SAMPLE (2)  → 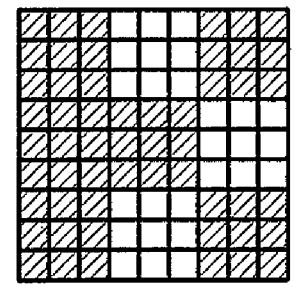
SAMPLE (3) 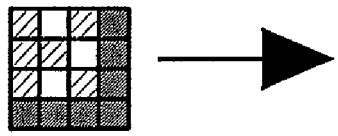 → 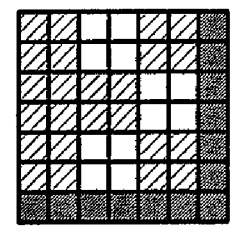

LATTICE CONNECTION BASED ON ADDITION OF
DARK PIXELS ARRANGED IN ⅃ -SHAPE

LATTICE CONNECTION BASED ON ADDITION OF
DARK PIXELS ARRANGED IN Γ-SHAPE

FIG. 18
NONLINEAR OVERSAMPLING
TWO-DIMENSIONALLY MODULATED DATA
4 BLOCKS
(LIGHT PIXELS ARE ARRANGED
EXCEPT FOR 4 CORNERS)
(3 * 3) * 4 = 36 PIXELS
SPATIAL LIGHT MODULATOR
4 BLOCKS
(6 * 6) * 4 = 144 PIXELS
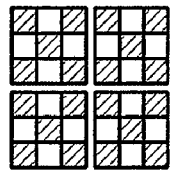  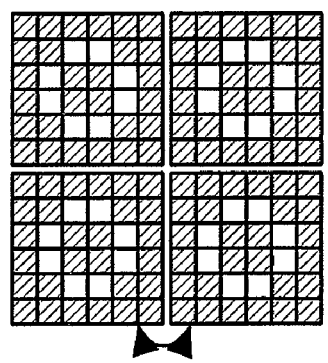
TRANSVERSE BLACK STRIPE
LONGITUDINAL BLACK STRIPE

TWO-DIMENSIONAL MODULATION METHOD FOR HOLOGRAM RECORDING AND HOLOGRAM APPARATUS WITH ENCODER FOR DRIVING SLM DISPLAYING BOUNDARY PORTION

TECHNICAL FIELD

The present invention relates to a hologram recording carrier, such as an optical disc or an optical card, in or from which information is optically recorded or reproduced, and a hologram apparatus, and more particularly to a two-dimensional modulation method for hologram recording.

BACKGROUND ART

A hologram with which two-dimensional data can be recorded with high density attracts attention for the purpose of high-density information recording. The feature of the hologram is that the wave surface of light which carries information to be recorded is voluminally recorded in the form of a change in refractive index in a hologram recording medium composed of a photosensitive material.

Heretofore, as a digital recording system to which the principles of holography is applied, for example, there is one which records or reproduces light or dark light dot pattern data in or from a recording medium made of a photo refractive crystal such as lithium niobate. In a holographic memory system, data can be recorded or reproduced in pages each having a two-dimensional plane, and also multiple recording can be made by utilizing a plurality of pages of the recording medium. In a recording medium which is a kind of Fourier Transformation hologram, data is dispersively recorded in two-dimensional image pages within a three-dimensional space. Hereinafter, an outline of a recording/reproducing system will be described.

In FIG. 1, an encoder 25 converts digital data to be recorded in a recording medium 1 into a light and dark dot pattern image on a plane, and rearranges the dot pattern image into data arrangement of, for example, 480 bits in length×640 bits in width, thereby generating two-dimensional page data. The data is sent, for example, to a spatial light modulator (SLM) 12 such as a panel of a transmission type liquid crystal display (LCD).

The spatial light modulator 12 has a modulation processing unit of 480 pixels in length×640 pixels in width corresponding to a unit page, and optically modulates light irradiated thereto into a spatial optical ON/OFF signal according to the page data sent from the encoder 25 and guides the signal as signal light to a lens 13.

The signal light is made incident to the recording medium 1 through the lens 13. In addition to the signal light, reference light is made incident at an incident angle β with respect to a predetermined reference line perpendicularly intersecting with a beam optical axis of the signal light to the recording medium 1.

The signal light and the reference light interfere with each other in the recording medium 1, and resulting interference fringes are stored in the form of a refractive index grating in the recording medium 1, thereby recording the data in the recording medium 1. In addition, the angle multiple recording of a plurality of two-dimensional plane data is performed by making the reference light incident to the recording medium 1 by changing the incident angle β, thereby allowing a large amount of information to be recorded.

When the recorded data is reproduced from the recording medium 1, only the reference light is made incident at the same incident angle β as that at the time of recording the refractive index grating in the recording medium 1. That is to say, unlike at the time of recording, no signal light is made incident to the recording medium 1. As a result, diffracted light from the refractive index grating recorded in the recording medium 1 is guided to an optical detector 22 such as a charge coupled device (CCD) through a lens 21. The optical detector 22 converts the intensity of the incident light into a level of an electrical signal, and outputs the analog electrical signal having a level corresponding to the luminance of the incident light to a decoder 26. The decoder 26 compares the analog signal with a predetermined amplitude value (slice level) and reproduces the data of "1" and "0" corresponding thereto.

With regard to a conventional two-dimensional modulation method for hologram recording, there is one in which when information (page data) is determined which is recorded in the form of signal light by passing non-modulated coherent light beam through the spatial light modulator 12, four or a multiple-of-four number of adjacent pixels of the spatial light modulator 12 are grouped in one set, and a quarter of the pixels constituting each group transmits light, and three-fourth of them shields light (refer to Japanese Unexamined Patent Publication No. Hei 9-197947).

The minimum pattern of the pixels of the spatial light modulator 12 with the two-dimensional modulation method for hologram recording, as shown in FIG. 2(a), consists of four parts. Only one part of them transmits light, and the other three parts of them shield light. There are four case classifications relating to which of the parts transmits light; the minimum pattern corresponds to 2 bits. The 2 bits are expressed depending on which of the parts transmits light. A bit string in FIG. 2 is one string, and other expressions of two bits are also possible. In FIG. 2, an open pixel indicates a pixel which "transmits light," and a black pixel indicates a pixel which "transmits no light."

When a bit string consisting of a plurality of "1" and "0" (FIG. 2(b)) is recorded, an arrangement as, for example, shown in FIG. 2(c) is taken on the spatial light modulator 12. Reading process proceeds from the top left side to the right, moves to a left end when reaching a right end and then moves one stage (two pixels) down and moves rightward again. The light which has penetrated through the spatial light modulator 12 is condensed by the lens and forms together with the reference light interference fringes in the recording medium, which are recorded in the recording medium.

DISCLOSURE OF THE INVENTION

In the two-dimensional modulation method for hologram recording according to such prior art, optical strains, deviations of signal images, and the like, occurring in a space between the spatial light modulator and the optical detector, due to a recording medium when it is newly mounted to the recording apparatus must be made less than a predetermined specific value.

In such prior art, the two-dimensionally modulated blocks (FIG. 2(a)) are simply two-dimensionally arranged, and thus the blocks after the two-dimensional conversion are connected to one another, thereby generating a spatially modulated image (FIG. 2(c)).

In the prior art, since the boundary between the connected blocks is not clear, it is feared that the data reproducing performance is degraded due to a shift in detection position at the time of reproduction. A shift in detection position occurs due to various factors such as deviations in magnification adjustment in an optical system, deviations in optical axis alignment, and distortions of images due to aberration of a lens, and it is impossible to remove all such factors.

Therefore, when a positional shift occurs, the block to be decoded is influenced by the light-transmittable light pixels of the adjacent blocks unless the adjacent pixels of all the adjacent blocks are dark pixels which shield light. As a result, errors occur in decoding.

Then, as a problem to be solved by the present invention, there can be mentioned as an example to provide a two-dimensional modulation method for hologram recording and a hologram apparatus capable of preventing degradation of a reproduction performance when a positional shift occurs, and thus enables information to be stably recorded or reproduced.

According to the present invention, there is provided a two-dimensional modulation method for hologram recording for generating coherent light containing therein page data through a spatial light modulator having a plurality of pixels two-dimensionally arranged therein, wherein the pixels of the spatial light modulator are partitioned into a plurality of blocks each having m pixels (where m=an integral number) adjacent to each other, and a boundary portion which has a width of at least the width of one pixel and the distance between adjacent pixels in each of the blocks, and which shields light is provided between the adjacent blocks.

According to the present invention, there is provided a hologram apparatus comprising a spatial light modulator having a plurality of pixels two-dimensionally arranged therein and irradiating coherent light containing therein page data to be recorded on a hologram recording carrier through the spatial light modulator to record information in an optical interference pattern generated by the coherent light as a diffraction grating, wherein the spatial light modulator has a plurality of blocks consisting of m pixels (where m=an integral number) adjacent to each other, and a boundary portion which is provided between the adjacent blocks and has a width having at least the width of one pixel and the distance between adjacent pixels in each block, and which shield light.

BRIEF DESCRIPTION OF THE DRAWINGS

FIG. 2 is a diagram explaining minimum patterns of pixels of a conventional two-dimensional spatial light modulator and combinations thereof.

FIG. 12 is a diagram explaining explanatory examples of the graph shown in FIG. 11.

FIGS. 13 and 14 are diagrams each showing a part of a table for explaining two-dimensional modulation for recording information in a hologram recording carrier of another embodiment mode according to the present invention.

FIG. 16 is an enlarged partial front view showing a schematic construction of a spatial light modulator of a hologram apparatus for recording information in a hologram recording carrier of another embodiment mode according to the present invention.

FIGS. 18 to 21 are diagrams each explaining a pattern of modulated data of connected blocks in the spatial light modulator of another embodiment mode according to the present invention.

MODE FOR CARRYING OUT THE INVENTION

Embodiments of the present invention will be described hereinafter with reference to the drawings.

<Hologram Apparatus>

Figure 1:
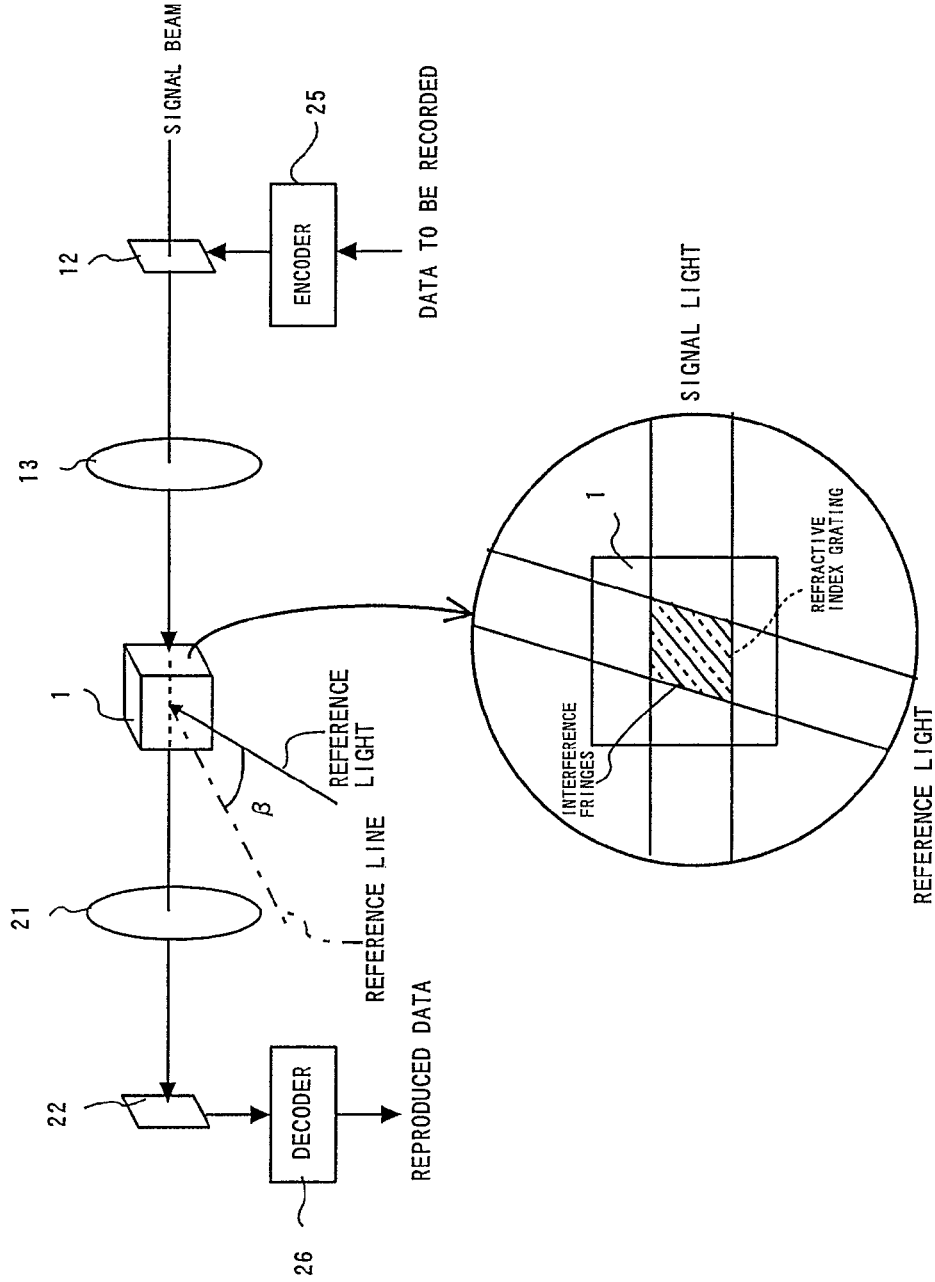
FIG. 1 is a schematic perspective diagram showing a conventional hologram recording/reproducing system.
Figure 3:
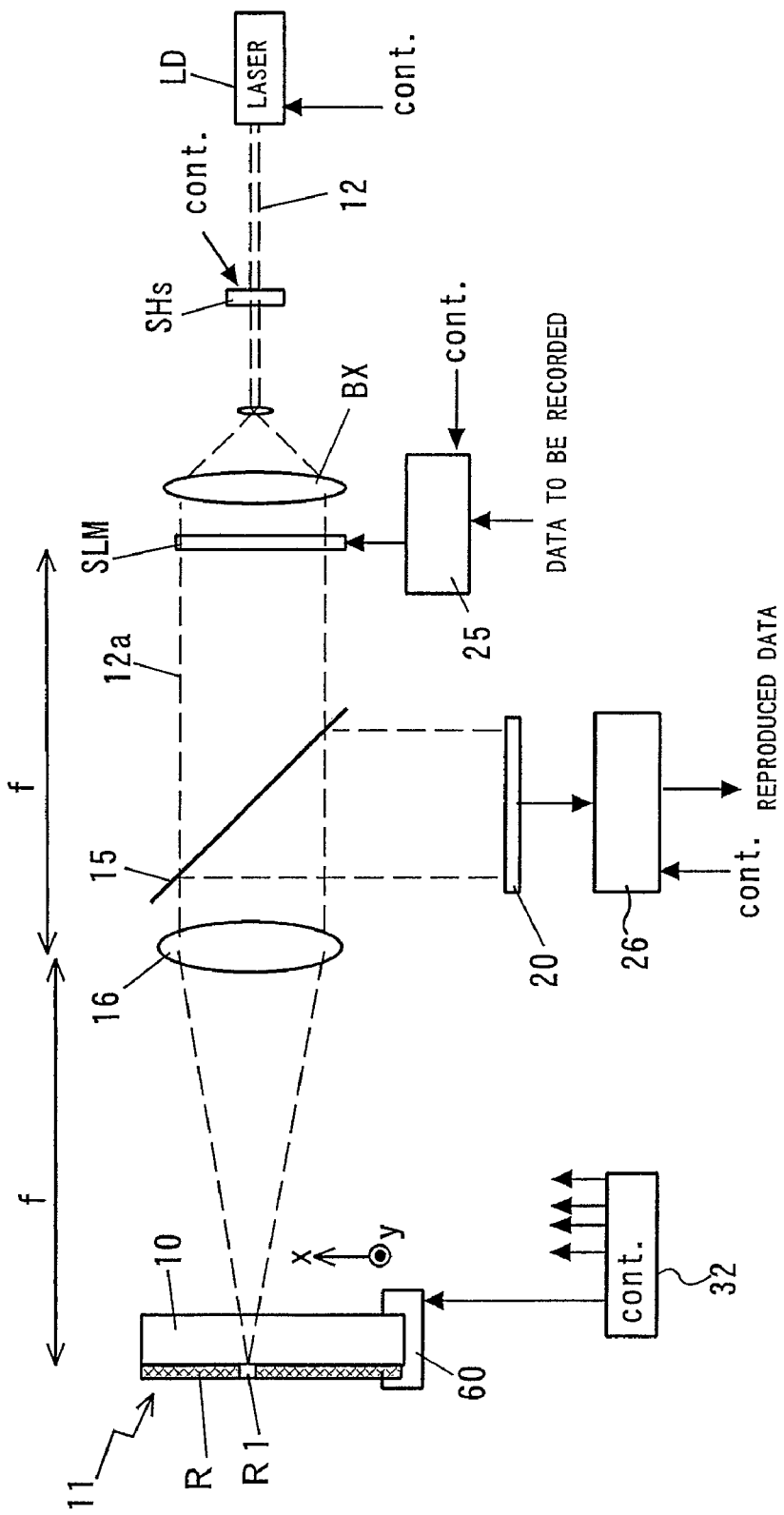
FIG. 3 is a block diagram showing a schematic construction of a hologram apparatus for recording or reproducing information in a hologram recording carrier of an embodiment mode according to the present invention.

FIG. 3 shows an example of a hologram apparatus for recording and/or reproducing information in a hologram recording carrier.

As a light source LD, for example, a near infrared laser is used. A shutter SHs, a beam expander BX, a transmission type spatial light modulator SLM, and an objective lens 16 are arranged in this order for interference on an optical path of reference light 12. The shutter SHs is controlled by a controller 32 to control irradiation time of a light beam to a recording medium portion.

The beam expander BX enlarges the diameter of the reference light 12 which has passed through the shutter SHs to make the reference light 12 parallel beams and then irradiates the beams incident on the spatial light modulator SLM.

The spatial light modulator SLM provided with a plurality of pixels which are arranged in matrix displays light pixels which transmit light or dark pixels which shield light in response to reception of page data supplied thereto from the encoder 25. When passing through the spatial light modulator SLM displaying the data, the reference light is optically modulated to signal light 12a containing the data.

The objective lens 16 subjects the page data of the signal light 12a to the Fourier transformation, and also condenses the signal light 12a so as to focus at the rear of the position where a recording medium portion 10 is mounted on a hologram recording carrier 11. When the shutter SHs is opened, signal light 12a or reference light 12 is irradiated at a predetermined incident angle, for example, at 0 degree on an incidence surface of the recording medium portion 10 by the objective lens 16. The spatial light modulator SLM is disposed at the focal distance of the objective lens 16.

A beam splitter 15 is added to an irradiation side optical system. An image detecting sensor 20 is disposed at an imaging position of a reconstructed wave reflected by the beam splitter 15, and a reconstructed wave (reproduced diffracted light) reflected by incident light processing area R is branched from the optical path of the reference light to be detected.

The image detecting sensor 20 is arranged at the focal distance of the objective lens 16, and is constituted by an array of charge coupled devices, CCDs, complementary metal oxide film semiconductor devices or the like.

Moreover, a decoder 26 is connected to the image detecting sensor 20. The decoder 26 is connected to the controller 32. In the case where a marker corresponding to the type of second photosensitive material is formed on the hologram recording carrier 11 in advance, when the hologram recording carrier 11 is installed on a movable stage 60 which is a supporting portion for moving the hologram recording carrier 11, the controller 32 automatically reads out the marker by using a suitable sensor. Thus, the controller 32 can also perform movement control of the hologram recording carrier 11 and recording/reproducing control suitable for the recording medium portion 10.

The recording is performed in the manner as described below. After having penetrated through the spatial light modulator SLM, the reference light emitted from the light source is optically modulated to the signal light 12a (the zero-order light and the diffracted light) which is in turn subjected to the Fourier transformation by the objective lens 16. The hologram recording carrier 11 has the incident light processing area portion R for reflecting the incident light at the rear of the recording medium portion 10. The incident light processing area portion R has an incident light transmitting portion R1 in a part thereof. The zero-order light component of the signal light which has penetrated through the spatial light modulator SLM is condensed in the vicinity of the position of the focal point of the objective lens 16 by the function of the objective lens 16 which is a Fourier transformation lens. The above-mentioned incident light transmitting portion R1 is placed in that position. Since the above-mentioned zero-order light component is an unmodulated component of the light which has penetrated through the spatial light modulator SLM, it functions as the reference light in the hologram recording. For this reason, the zero-order light and the diffracted light form a light interference pattern within the recording medium portion 10. The resulting light interference pattern is recorded in the form of a diffraction grating having a change in refractive index according to its intensity distribution. The hologram recording is performed based on the interference between polarized light components in which directions of planes of polarization of the zero-order light and the diffracted light within the recording medium portion 10 are identical to each other.

On the other hand, during reproduction, unmodulated reference light (that is, only the zero-order component) is irradiated on the recording medium portion 10 as it is by the spatial light modulator SLM. The reconstructed wave (the reproduced diffracted wave) corresponding to the recorded signal light appears in the incident light processing area portion R which is provided on the side opposite to the incidence side of the recording medium portion 10 on which the reference light has been irradiated. The reconstructed wave is guided to the objective lens 16 and then the inverse Fourier transformation is carried out. The image detecting sensor 20 receives a dot pattern image based on the reconstructed wave, and reconverts the dot pattern image into an electrical digital data signal, which is then sent to the decoder 26 to reproduce the original data.

In addition to the above-mentioned reconstructed wave, a reference light component which has not been diffracted by the diffraction grating within the recording medium also appears from the recording medium portion 10 on which the reference light has been irradiated. Since this reference light component is a zero-order light, it is condensed in the position of the focal point of the objective lens 16 which is a Fourier transformation lens. This zero-order light (that is, the reference light component) penetrates through the incident light transmitting portion R1 provided in the incident light processing area portion R. On the other hand, the diffracted light of the signal light is reflected by the incident light processing area portion R. Therefore, the recorded signal is selected and guided to the image detecting sensor 20 through the objective lens 16.

Moreover, while not illustrated, an optical system for tracking and focusing servo can be added in order to servo-control the objective lens. A servo laser beam from a laser light source for focusing and tracking servo, and a signal light are merged or branched by a dichroic mirror. Thus, focus error and tracking error signals can be obtained by utilizing, for example, an astigmatism method or a push-pull method (Japanese Unexamined Patent Publication No. 2001-273650).

In order to perform optical modulation according to the two-dimensional modulation described below, the data to be recorded is inputted in the form of image data which is binary quantized in, for example, light pixels and dark pixels into the spatial light modulator. The spatial light modulator two-dimensionally modulates the recording laser beam according to the input image data. After that, the spatial light modulator records the hologram (interference fringes) in the recording layer of the hologram recording carrier by utilizing, for example, a self-coupling system (Japanese Patent Application Nos. 2002-225053 and 2005-225053).

With regard to the reproduction by a self-coupling system, the spatial light modulator is set in a non-modulation state (in a state of transmitting all light), and the reproduction is performed with the light as the reference light.

<Two-dimensional Modulation>

Figure 4:
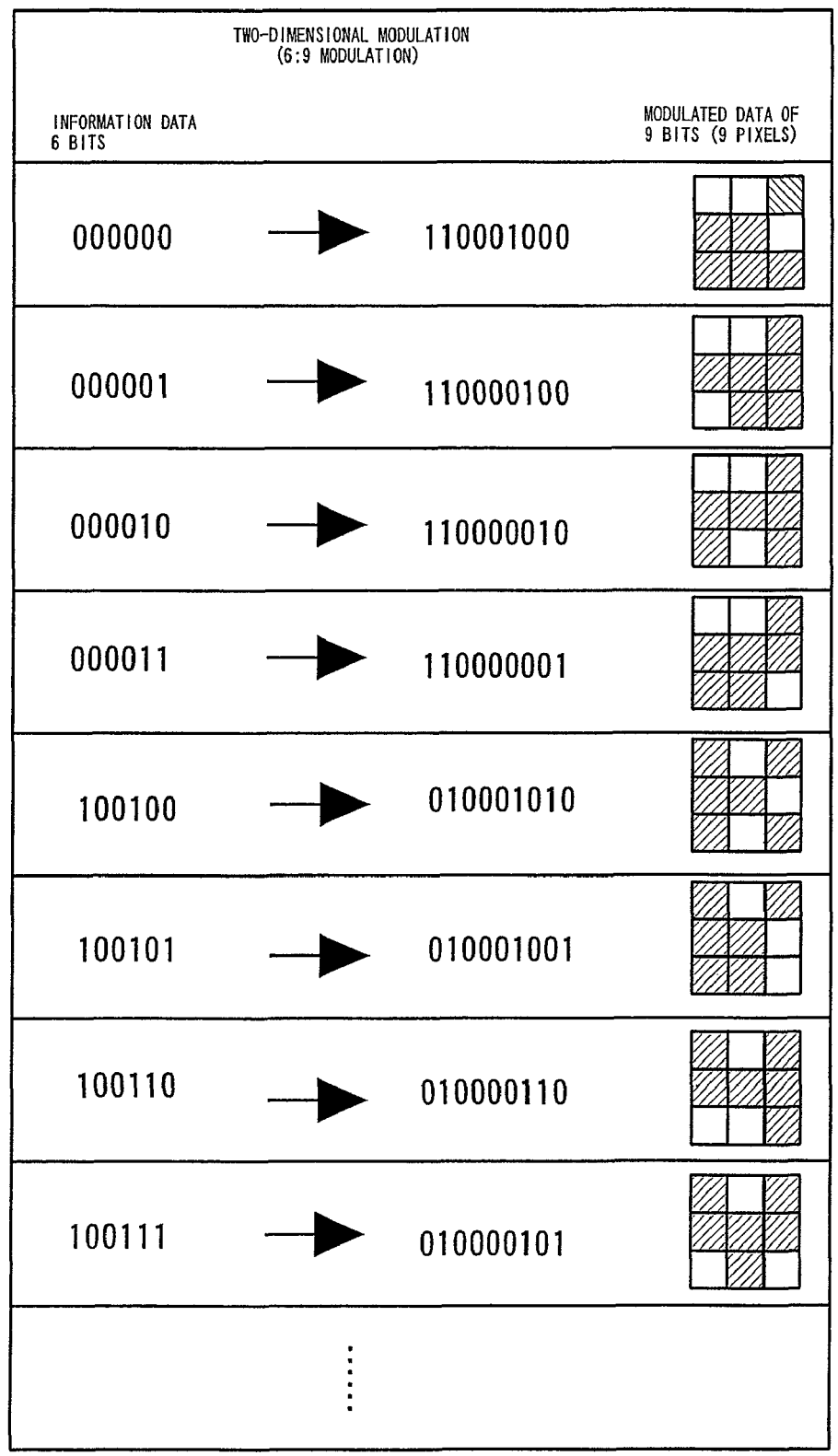
FIG. 4 is a diagram showing a part of a table for explaining two-dimensional modulation for recording information in the hologram recording carrier of the embodiment mode according to the present invention.

In an example of the two-dimensional modulation, the information data is partitioned in 6 bits, and the resulting information data for each 6 bits is two-dimensionally modulated into modulated data of 9 bits (3×3=9 pixels) by referring to a predetermined modulation table (a part of the table is shown in FIG. 4).

As shown in FIG. 4, each piece of the information data of 6 bits, for example, (000000) (000001) (000010) (000011) (100100) (100101) (100110) (100 111) is two-dimensionally encoded into 9 bits (9 pixels constitute 1 block) according to which light pixels transmitting light and the dark pixels shielding light are arranged in matrix. Since the information data of 6 bits is converted into the modulated data of 9 bits by referring to the predetermined modulation table shown in FIG. 4, this modulation is referred to as 6:9 modulation.

In a procedure of such two-dimensional modulation, as a first stage, for example, input information data such as audio information or image information is partitioned into 6 bits data strings. As a second stage, the inputted strings of 6 bits are outputted in the form of binary pixel data where 9 pixels (9 bits) consisting of light pixels and dark pixels are two-dimensionally arranged.

A method of generating a modulation table will now be described. The inputted 6 bits gives $2^6=64$ combinations. On the other hand, since 9 bits are obtained after the modulation, 64 combinations may be selected from among $2^9=512$ combinations. As a guide to selection, firstly, the number of light pixels after the modulation is made constant, and secondly any of the combinations of the 3 continuous light pixels are avoided. In one block, $3\times3=9$ pixels and 9 bits show one-to-one correspondence. Combinations in which 3 light pixels are selected from among 9 pixels, and all the remaining pixels are set as dark pixels are $9C3=9\times8\times7/(3\times2)=84$ combinations. 64 combinations are selected from among the 84 combinations with any of the combinations of the 3 continuous light pixels being avoided, thereby generating a modulation table. That is to say, not only the 6:9 modulation, but also n:m modulation is possible for the two-dimensional modulation. The n:m modulation includes the steps of: grouping data to be recorded n bits each (where n<m, and n=an integral number); generating page data by carrying out two-dimensional modulation for allocating grouped n bit data as m bit data to each block, by referring to the modulation table; and driving the spatial light modulator according to the data. As examples of n:m modulation, a 2/4 modulation is described in Japanese Unexamined Patent Publication No. Hei 9-197947, and a 5:9 modulation is described in Japanese Unexamined Patent Publication No. 2001-75463.

Figure 5:
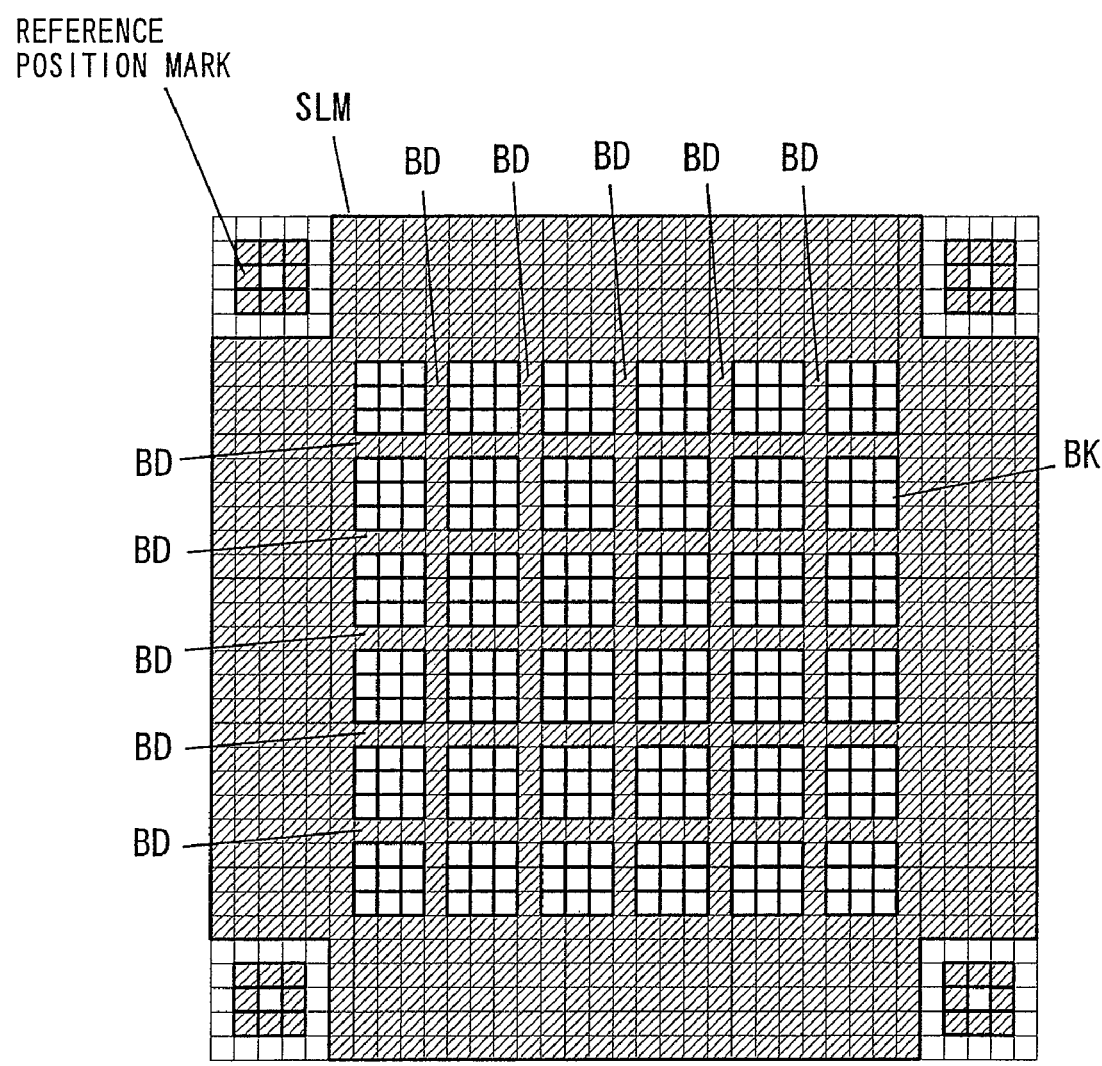
FIG. 5 is a front view showing a schematic construction of a spatial light modulator of a hologram apparatus for recording information in the hologram recording carrier of the embodiment mode according to the present invention.
Figure 6:
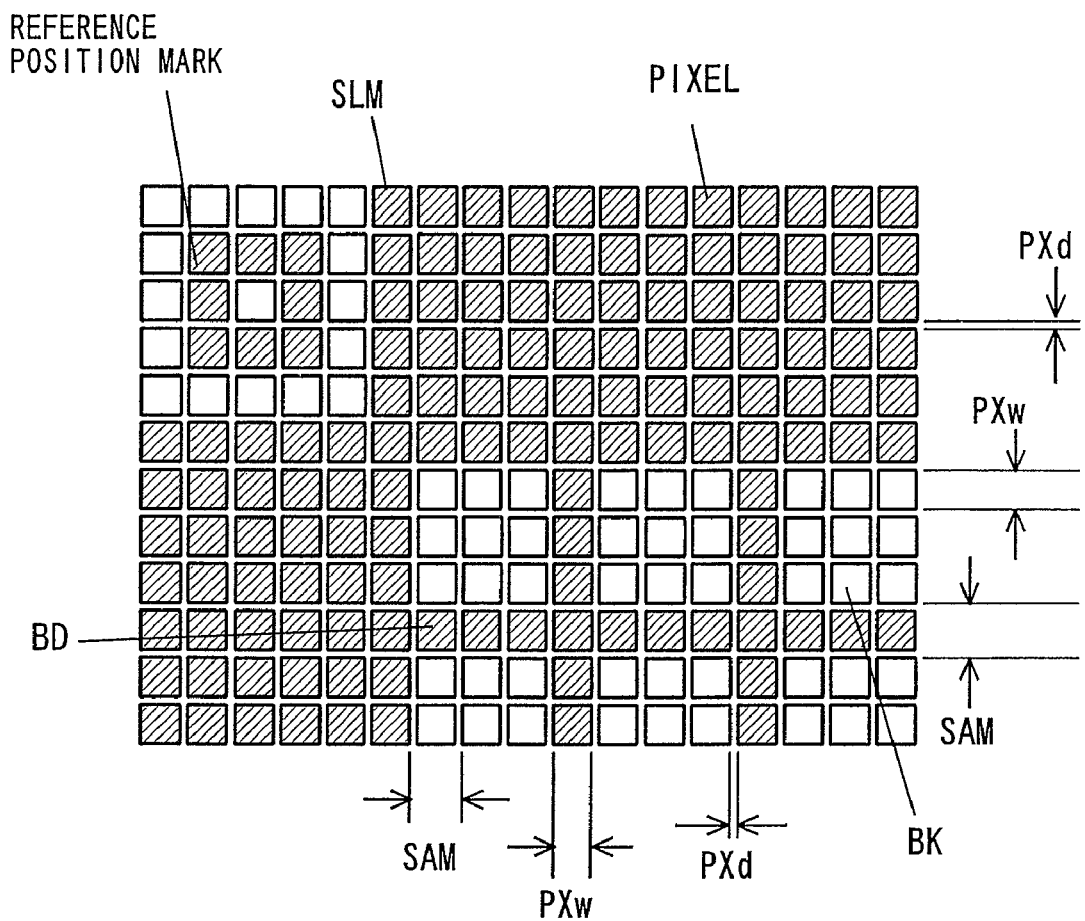
FIG. 6 is an enlarged partial front view showing a schematic construction of the spatial light modulator of the hologram apparatus for recording information in the hologram recording carrier of the embodiment mode according to the present invention.

Moreover, in this embodiment mode, as in the spatial light modulator SLM shown in FIG. 5, the encoder 25 partitions drives the spatial light modulator SLM such that the pixels are partitioned into a plurality of blocks BK each having m pixels (m=9) adjacent to each other by boundary portion BD. The spatial light modulator SLM is driven, as shown in FIG. 6, such that boundary portion BD (the lattice-like connection area) which has total width SAM having at least the width PXw of one pixel and the distance PXd between adjacent pixels in each block, and which shields light is defined between adjacent blocks.

In the demodulation step, first, reference position marks indicating the reference position of the image in a hologram recorded page, and being placed, for example, in the four corners of the image are detected, and then size, positional shift and distortion of the image are corrected. The corrected image in one page is partitioned at equal intervals into modulation blocks, and demodulation is performed from the values of the pixels within each block by referring back to the predetermined conversion table in the opposite direction.

For detection of the reference portions, correlation between the reference position marks and the hologram reconstructed image are sequentially obtained while relative positions of the reconstructed image with respect to the reference image is shifted. A place where the maximum correlation value is obtained is the reference position of the reconstructed image.

Deviations in magnification adjustment of the optical system, medium contractions, and distortions due to lens, or the like are corrected by geometrical correction (pseudo-affine transformation) for the reconstructed image based on the detected reference position.

Then, a corrected image in one page is partitioned at equal intervals into modulation blocks.

For example, when the modulation is a 6:9 modulation, the top 3 pixels in terms of pixel values in each modulation block are judged to be white, while the other pixels are judged to be black, and the data is temporarily demodulated into 9 bit binary data.

Next, the 9 bit binary data is demodulated into the original information data of 6 bits by referring back to the above-mentioned conversion table in the opposite direction.

When the construction of this scheme is adopted in which a gap is provided between modulation blocks, demodulation errors can be reduced without substantially decreasing the capacity in one page.

First Embodiment Mode

Figure 7:
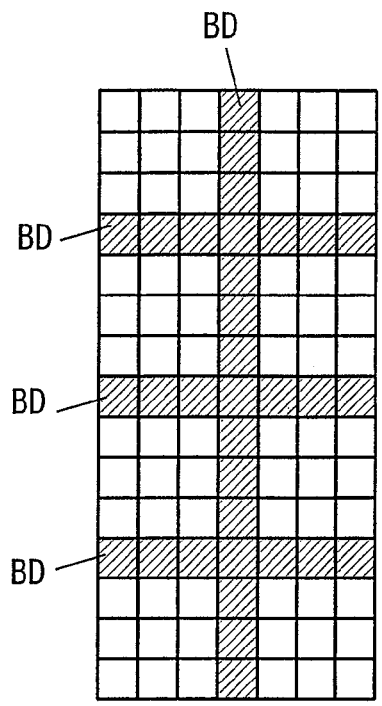
FIG. 7 is a diagram explaining a pattern of a boundary portion in the spatial light modulator of the embodiment mode according to the present invention.
Figure 8:
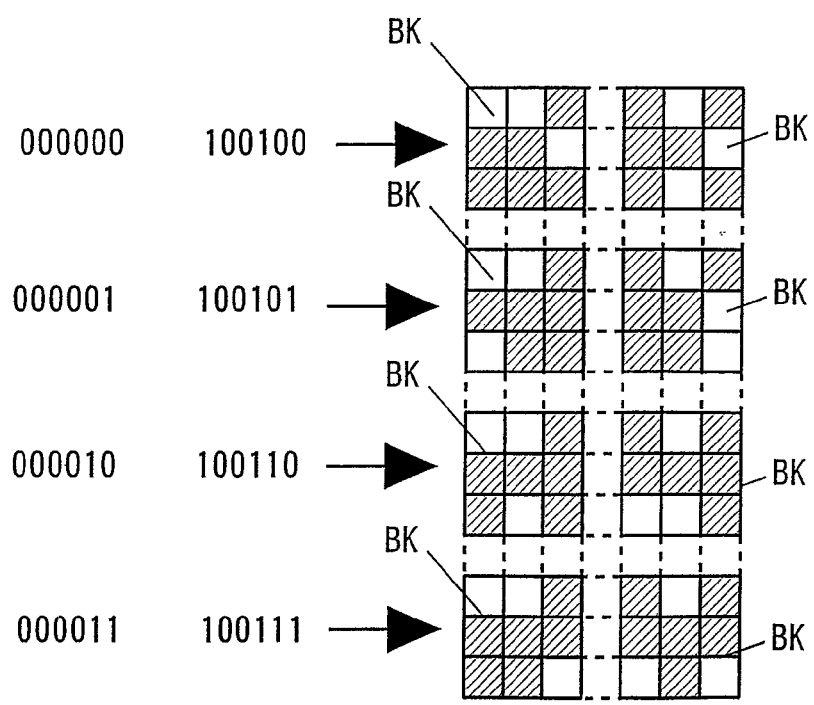
FIG. 8 is a diagram explaining a pattern of modulated data in the spatial light modulator of the embodiment mode according to the present invention.

In the step of generating page data executed within the encoder 25 (or in the controller 32), boundary portion data for the boundary portion is added to each block. The boundary portion data thus added is used as dummy data for formation of boundary portion BD (lattice-like connection area) shielding light. For example, the encoder 25 drives the spatial light modulator SLM such that modulated data for boundary portion BD for 8 blocks as shown in FIG. 7 is generated, and thus generated and two-dimensionally modulated data for 8 blocks as shown in FIG. 8 are superimposed on one another (such that the added boundary portion data is replaced with the data for the connection area (the portion indicated by a broken line in FIG. 8)). As a result, the boundary portion BD (lattice-like connection area) consisting of dark pixels can be defined in advance, and the two-dimensionally modulated blocks can be allocated within the lattice.

As for specific modulation procedures, a conversion table for the information data of 6 bits and the modulated data of 9 bits as shown in FIG. 4 is generated in a memory or the like in advance. Next, a page memory for storing therein the modulated data in one page is cleared (all the pixels of the spatial light modulator SLM are set as dark pixels (including the boundary portion BD)). Next, as shown in FIG. 5, the reference position marks are written in the four corners. Next, the data which is used to provide a space between the modulated blocks which are shown in FIG. 8 and into which the information data is converted by referring to the conversion table is sequentially written from the top left in the page memory.

Figure 9:
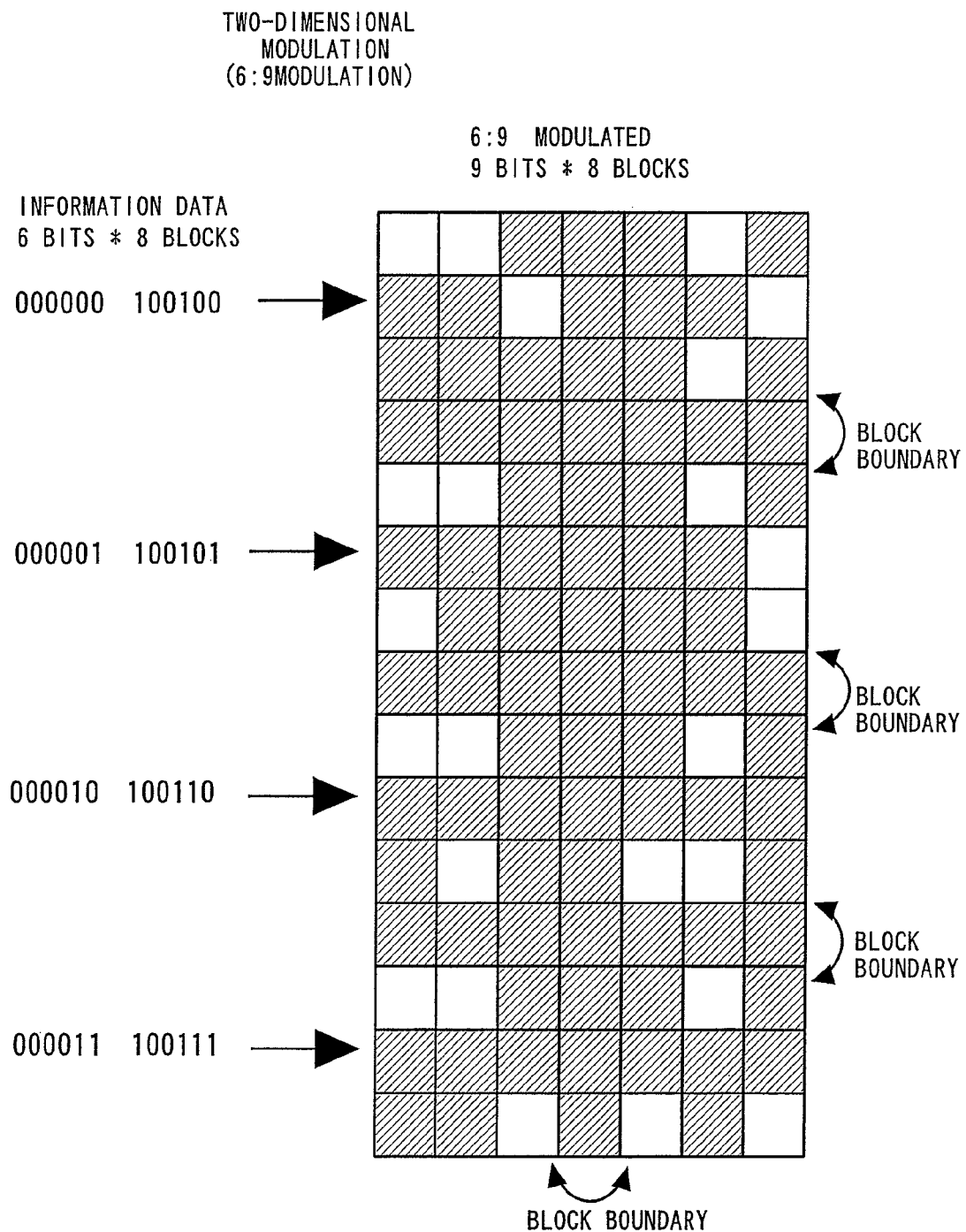
FIG. 9 is a diagram explaining a pattern of modulated data in which 8 blocks are connected to one another through a boundary portion BD in the spatial light modulator of the embodiment mode according to the present invention.

FIG. 9 shows a pattern of modulated data in the spatial light modulator when the 8 blocks are connected to one another through the boundary portion BD in the case of this embodiment mode.

Figure 10:
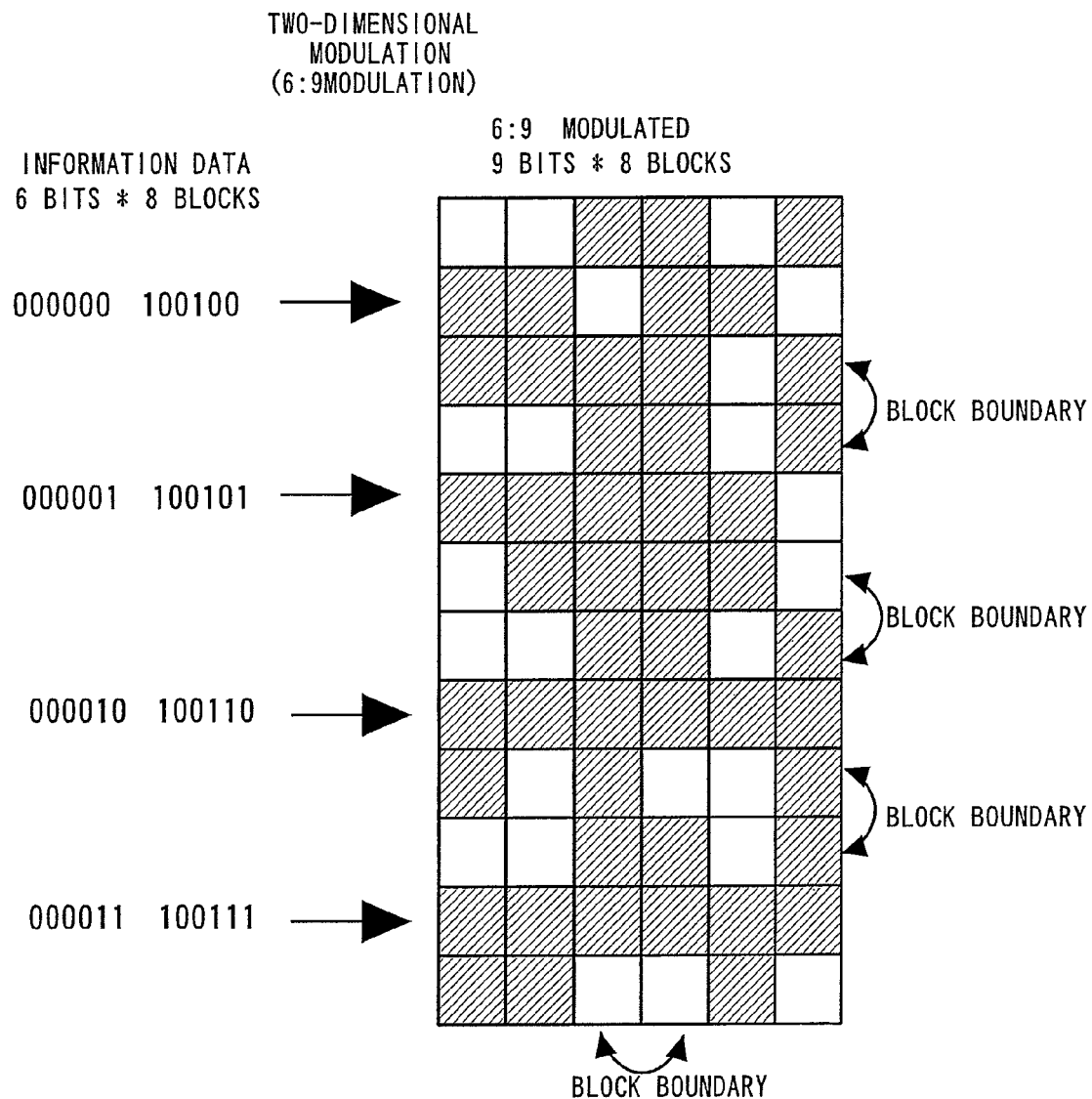
FIG. 10 is a diagram explaining a pattern of modulated data in the spatial light modulator in which 8 blocks are directly connected to one another.

An example in which 8 blocks after two-dimensional modulation of similar data are simply arranged and 8 blocks connected to one another are shown as a comparative example in FIG. 10. With a method shown in FIG. 10, since the boundary between the connected blocks is not clear, the degradation of the data reproduction performance due to the detection positional shift occurs at the time of reproduction. The detection positional shift occurs by various factors such as deviations in magnification adjustment in the optical system, deviations in optical axis alignment, and distortions of the image due to aberration or the like of the lens. Thus, it is impossible to remove all the factors.

When FIGS. 9 and 10 after block connection are compared, it is understood that in FIG. 10 where blocks are simply arranged, the boundary between the blocks is not clear because its width has only the distance between the pixels, and such construction allows blocks to be easily affected by the light pixels of their adjacent blocks when positional shift occurs. On the other hand, in FIG. 9 where blocks are connected to one another through boundary portion BD having a lattice-like dark pixel arrangement, the boundary between blocks is clear because they are connected through a boundary portion, consisting of dark pixels, having the width of at least one pixel, and thus even when the positional shift occurs, it is unlikely that blocks are affected by the light pixels of their adjacent blocks.

Consequently, degradation in reproduction performance due to positional shift can be prevented. Specifically, this embodiment mode has the effect of decreasing the number of errors at the time of the reproduction and enhancing the reproducing bit error rate characteristics.

As for other effects of this embodiment mode, since the blocks are connected to one another through a boundary portion, consisting of dark pixels, having the width of at least one pixel, it is possible to prevent continuation of light pixels across blocks. Since it is possible to limit the number of continuous light pixels, it is possible to suppress the low frequency components of the spatial frequencies after the Fourier transformation, it is possible to suppress the saturation of the diffraction efficiency of the recording layer, and to enhance the multiplicity of information recordable in the hologram recording carrier, leading to the increase of recording capacity increases. In addition, since it is possible to reduce the appearance probability of the light pixels, the probability of erasing the already recorded page at the time of the multiple recording decreases, which makes it possible to enhance multiplicity. This is preferable because the recording capacity increases.

Figure 11:
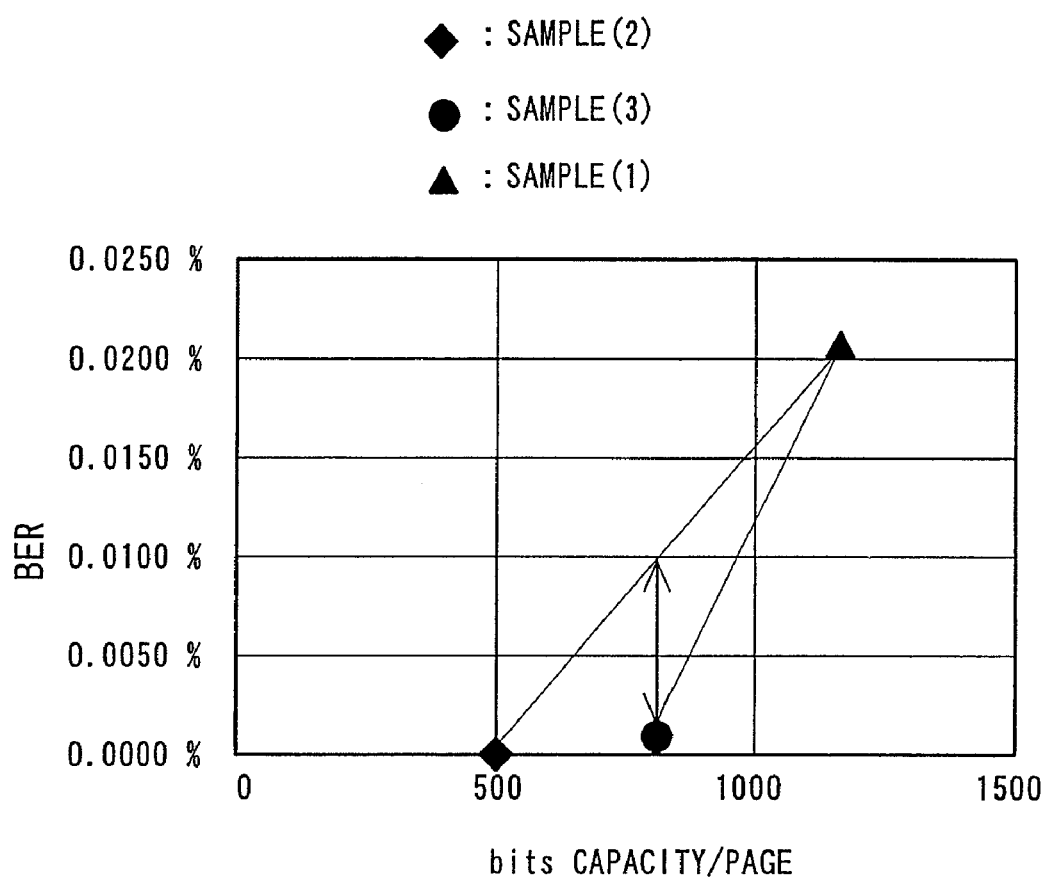
FIG. 11 is a graph showing comparative experimental results of a two-dimensional modulation method with which a reproduction error rate is measured by various over sampling.
Figure 1:
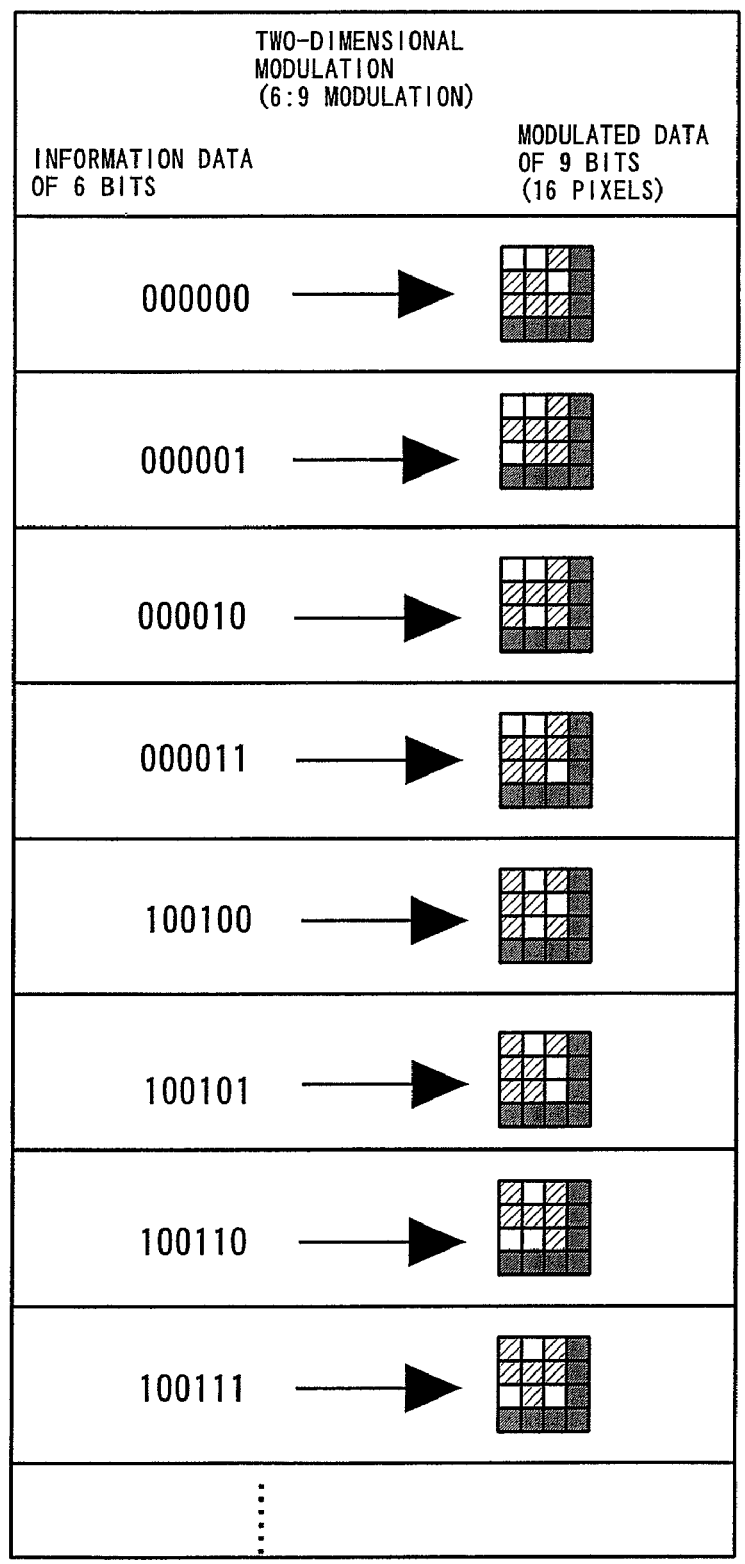

FIG. 11 shows comparative experimental results on the two-dimensional modulation method by which the reproducing bit error rate is measured by variously performing the over sampling. The axis of abscissa in FIG. 11 indicates a recording capacity (bits capacity/page) per one page. An axis of ordinate in FIG. 11 indicates a bit error rate (BER) at the time of reproduction.

The triangle point of Sample (1) shown in FIG. 11 indicates the reproduction bit error rate which was measured by over sampling one pixel of the spatial light modulation after the two-dimensional modulation, to 2×2=4 pixels of the image detecting sensor. Here, one pixel of the spatial light modulator corresponds to 4 pixels of the image detecting sensor. Also, as shown in Sample (1) of FIG. 12, the number of pixels in one block of the image detecting sensor corresponding to one block (9 pixels) of the spatial light modulator is 4×9=36 pixels. In the spatial light modulator, the blocks are simply connected and arranged for display.

The square point of Sample (2) shown in FIG. 11 indicates reproducing bit error rate which was measured by oversampling one pixel of the spatial light modulation after the two-dimensional modulation to 3×3=9 pixels of the image detecting sensor. Here, one pixel of the spatial light modulator corresponds to 9 pixels of the image detecting sensor. Also, as shown in Sample (2) of FIG. 12, the number of pixels in one block of the image detecting sensor corresponding to one block (9 pixels) of the spatial light modulator is 9×9=81 pixels. In the spatial light modulator, the blocks are simply connected and arranged for display.

The round point of Sample (3) shown in FIG. 11 indicates reproducing bit error rate which was measured by oversampling one pixel of the spatial light modulator, to 2×2=4 pixels of the image detecting sensor when one page is constructed by using the lattice-like interblock connection comprising dark pixel strings (boundary portion BD) of this embodiment mode after the two-dimensional modulation. Here, one pixel of the spatial light modulator corresponds to 4 pixels of the image detecting sensor. Also, as shown in Sample (3) of FIG. 12, the number of pixels in one block of the image detecting sensor corresponding to one block ((3×3)+7=16 pixels) of the spatial light modulator, is (4×9)+13=49 pixels. It is possible to reduce the number of pixels per one block of the image detecting sensor because no dark pixel for the boundary portion BD is required in the peripheral portion of one block of the image detecting sensor corresponding to one block of the spatial light modulator. In other words, in Sample (3) of FIG. 12, simple oversampling of 2×2 pixels is not performed, but each of 3×3=9 pixels of the spatial light modulator in the 6:9 modulation itself is simply 2×2 oversampled. Thus, the number of pixels of the image detecting sensor is 9×4=36 pixels. On the other hand, in the boundary portion (black portion) between adjacent blocks of the spatial light modulator, a hook-shaped (⌐-shaped)light shielding portion having a width corresponding to the width of only one pixel of the image detecting sensor is arranged in the spatial light modulator in advance. Here, when the pixel of the spatial light modulator is regarded as a unit, the hook-shaped (⌐-shaped) light shielding portion on the spatial light modulator has the width of ½ pixel. In addition when the pixel in the image detecting sensor is regarded as a unit, the hook-like (⌐-shaped) light shielding portion in the image detecting sensor has 6×2+1=13 pixels.

As shown in FIG. 11, the number of blocks per unit page is proportional to the recording capacity, and the recording capacity becomes greater, i.e., superior in the order of (2)< (3)<(1) in the samples. On the other hand, the reproducing bit error rate (BER) is higher, i.e., inferior in the order of (2)<(3) <(1).

In the case of Sample (3) implementing this embodiment mode, both the recording capacity and the reproducing bit error rate characteristics are ranked middle. However, its bit error rate is excellent because it is significantly lower than that of Sample (1). In addition, in the case of Sample (3) implementing this embodiment mode, while its recording capacity is excellent because it is significantly higher than that of Sample (2), the reproducing bit error rate is suppressed to a small increase.

As explained heretofore, the portion indicated by an arrow shown in FIG. 11 shows the effect of this embodiment mode.

Here, oversampling means that the number of pixels (of the spatial light modulator) at the time of recording is multiplied by a predetermined number to obtain the number of pixels (of the image detecting sensor) at the time of reproduction to enhance the spatial resolving ability at the time of reproduction. Thus, the obtained reconstructed image can be geometrically corrected. When the two-dimensionally modulated and binarized image (the binary of light pixels and dark pixels) is reconstructed by oversampling, both the light pixel and the dark pixel are oversampled, in general, with an equal magnification. The oversampling makes it possible to ensure for extremely difficult pixel matching. Pixel matching means that one pixel of the spatial light modulator at the time of recording and one pixel of the image detecting sensor at the time of reconstruction are made to perfectly agree in size and position with each other.

Second Embodiment Mode

In this example of two-dimensional modulation, each 6 bits of the information data is two-dimensionally modulated into the modulation data of 16 bits ((3×3)+7=16 pixels) by referring to a predetermined modulation table (a part of the table is shown in FIG. 13). A new block ((3×3)+7=16 pixels) in which 7 pixels constituting a dark pixel string arranged in an angle bracket shape (⌐) are added to 9 bits (9 pixels constitute one block) of light and dark pixels arranged therein in matrix is generated from the information data of six bits according to the modulation table as shown in FIG. 13, for example, (000000)(000001)(000010)(000011)(100100)(100101)(100110)(100

111). The resulting new blocks are simply arranged in the spatial light modulator, thereby generating page data including boundary portion BD consisting of dark pixel strings arranged in lattice.

Figure 14:
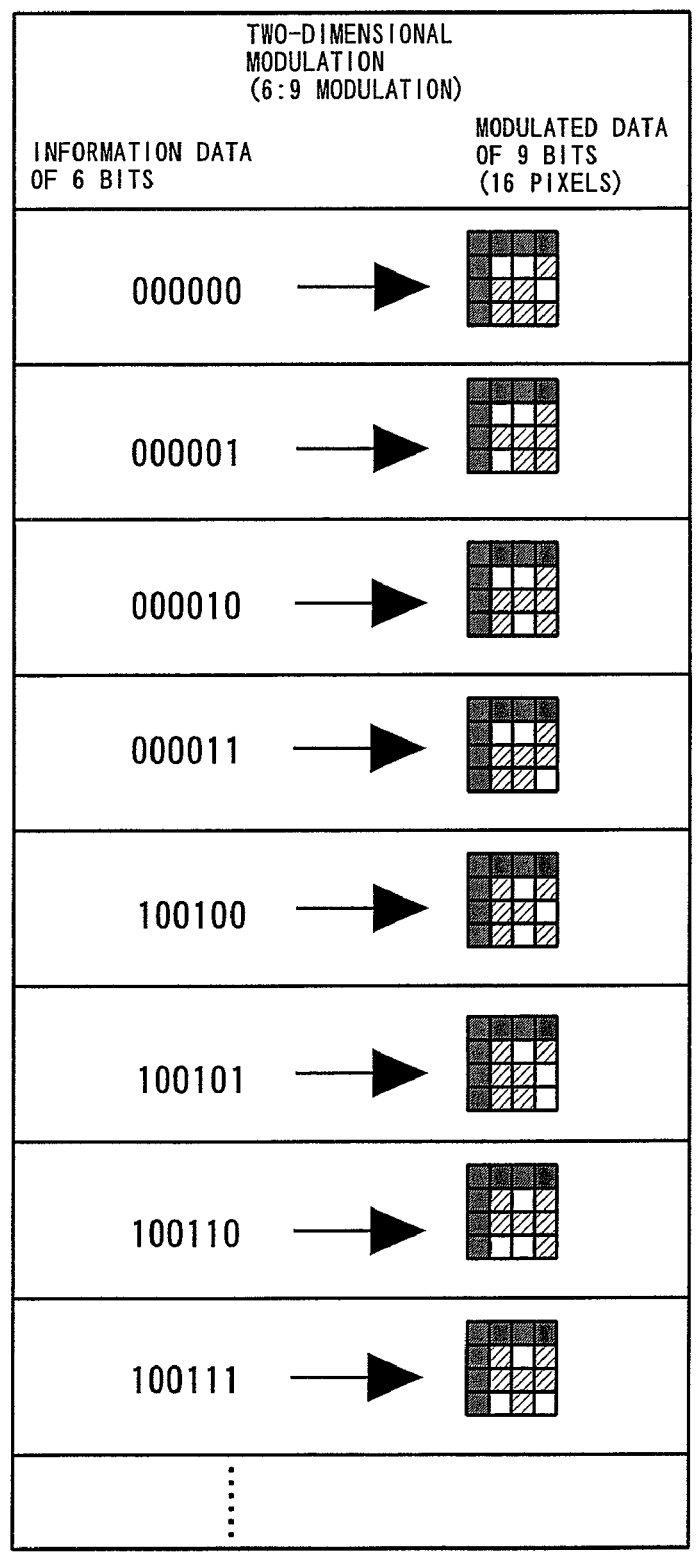

Similarly, FIG. 14 shows a part of a modulation table according to which new blocks in each of which dark pixels arranged in an angle bracket shape (⌐) are added are simply arranged in the spatial light modulator, thereby generating page data including boundary portion BD consisting of dark pixel strings arranged in lattice.

In the manner as described above, in any of the above-mentioned embodiment modes, the data to be recorded is grouped into the blocks per n bits (where n<m, and n=an integral number), and the two-dimensional modulation where m bit data is allocated to each block having n bits, by referring to the modulation table is carried out. Also, the boundary portion data (dummy or dark pixels) for the boundary portion BD is added to each of the blocks, thereby generating page data.

Third Embodiment Mode

In the examples of the above-mentioned lattice forming method, examples are given in which dark pixels arranged in lattice are inserted by using the spatial light modulator SLM having a plurality of pixels arranged in matrix for displaying light pixels which transmit light or dark pixels which shield light, thereby blocks after two-dimensional modulation are connected to each other. In addition thereto, a spatial light modulator having a specific shape may be used.

Figure 15:
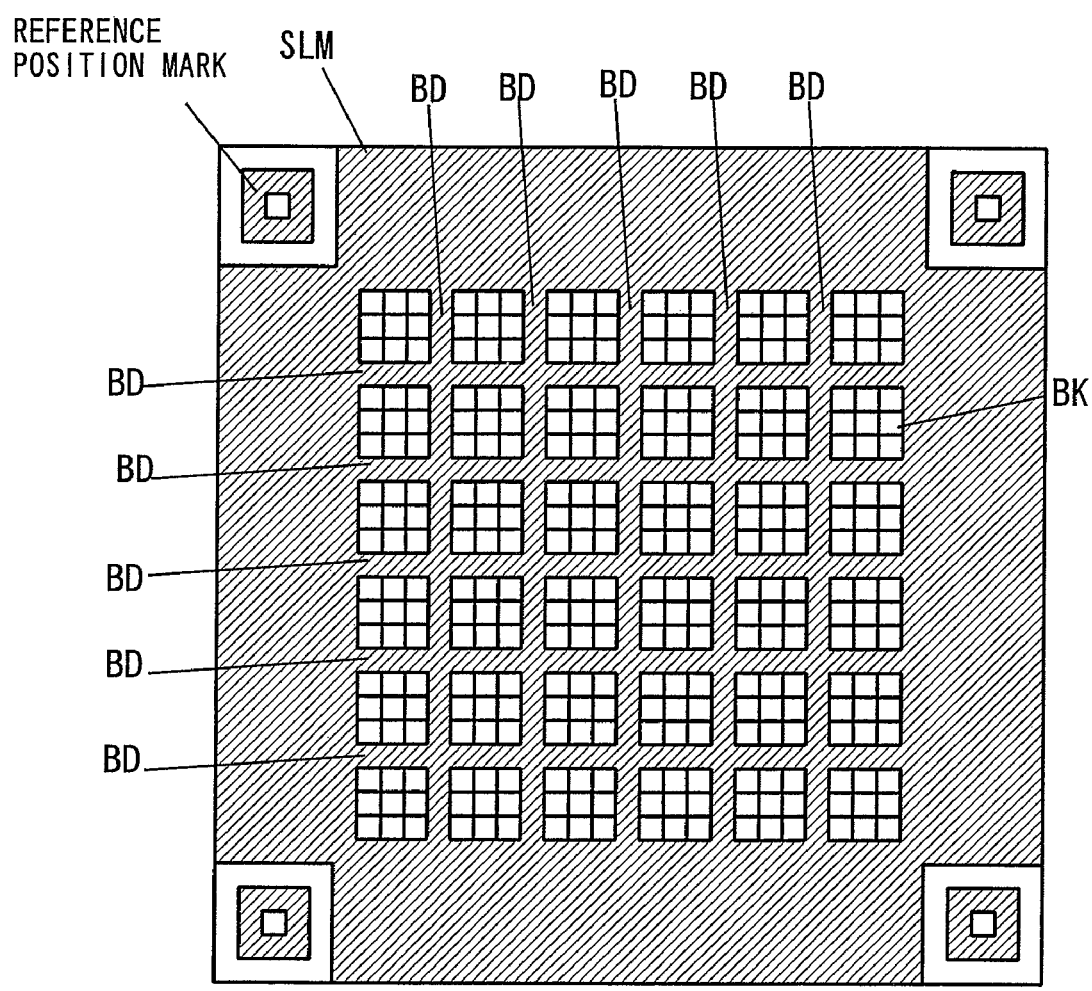
FIG. 15 is a front view showing a schematic construction of a spatial light modulator of a hologram apparatus for recording information in a hologram recording carrier of another embodiment mode according to the present invention.
Figure 1:
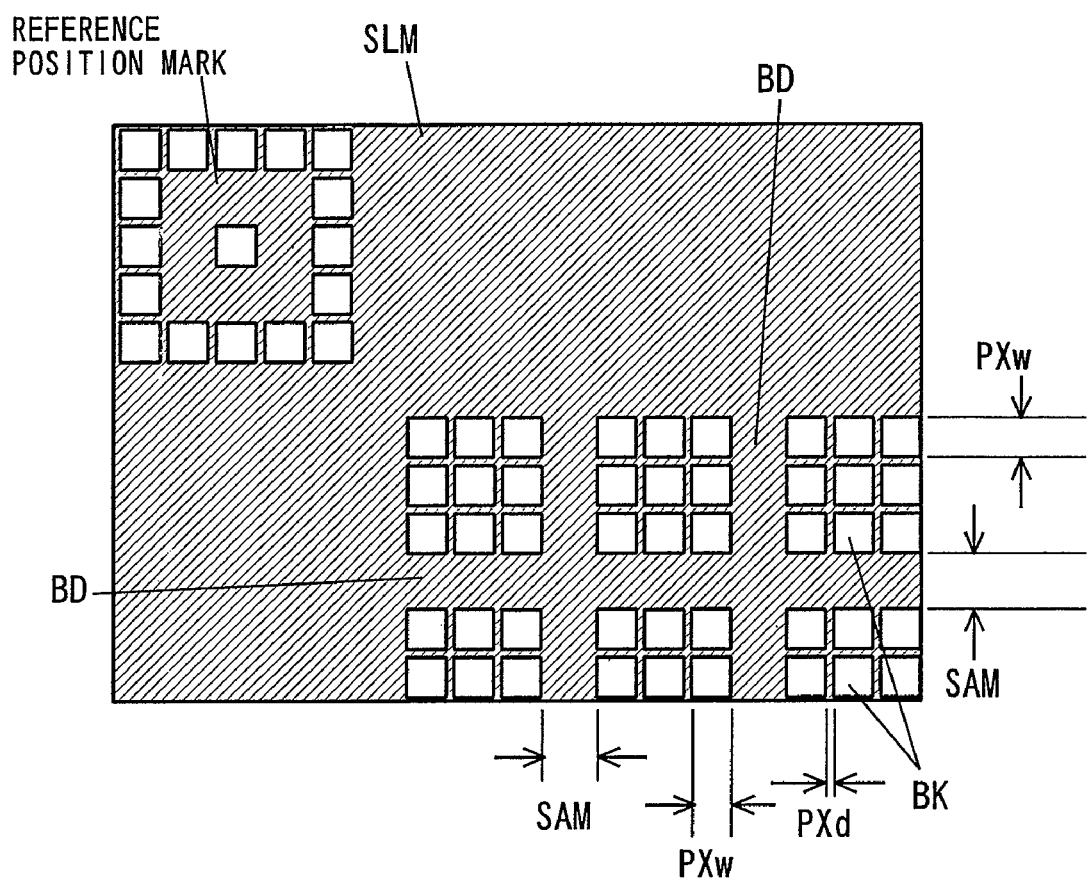

For example, as shown in FIG. 15, a construction may also be adopted in which the pixels of the spatial light modulator are partitioned into blocks each having the same number of pixels as that of one block BK after two-dimensional modulation (or as the integral multiple of the pixels of one block BK), and the pre-partitioned blocks BK are arranged in lattice having a space in between so as to have the structure of the boundary portion BD which shields light. That is to say, as shown in FIG. 16, the spatial light modulator includes a plurality of blocks each having adjacent m pixels (wherein m=an integral number), and a boundary portion which is provided between the adjacent blocks, which has a width having at least the width of one pixel of the image detecting sensor and the distance between adjacent pixels in each block, and which shields light. When this construction is adopted, there is an advantage that the lattice-like dark pixel portion can be formed without increasing the number of pixels of the spatial light modulator. Moreover, this embodiment mode offers a secondary effect that it is unnecessary to carry out the spatial modulation in the lattice portion, and thus a driving circuit or the like can be disposed.

When the reconstruction is made by performing the oversampling, for example, when 2×2-fold oversampling of is performed, the width of one pixel of the image detecting sensor becomes half the width of one pixel of the spatial light modulator. Here, the width required for the boundary portion BD in the spatial light modulation becomes k integral multiple of half the width of one pixel in the block BK of the spatial light modulator when the half is regarded as a unit. If this is generalized, when the reconstruction is made by performing n×n oversampling (n is an integral number), k integral multiple of 1/n of the width of one pixel in the block BK of the spatial light modulator when 1/n is regarded as a unit is suitable for the width required for the boundary portion BD of the spatial light modulator.

Fourth Embodiment Mode

When the two-dimensionally modulated and binarized image (a binary of light pixels and dark pixels) is reconstructed by oversampling, in general, both light pixels and dark pixels are oversampled with an equal magnification.

On the other hand, with the two-dimensional modulation method for hologram recording of another example of this embodiment mode, at the time of recording, a conversion similar to the oversampling is carried out. That is to say, the feature of this two-dimensional modulation method for hologram recording is that the oversamplings for light pixels and dark pixels are not treated in the same manner. Thus, in the following description, such oversampling will be referred to as nonlinear oversampling.

When the nonlinear oversampling is performed by the two-dimensional modulation, one dark pixel is increased (to the number of dark pixels with a specific magnification), whereas one light pixel is not increased simply to a plurality of light pixels, but is increased to a plurality of pixels where light pixels and dark pixels are combined. Moreover, in order to make the boundary between the blocks clear during the nonlinear oversampling, one light pixel is increased to a number of pixels in which light pixels and dark pixels are combined so that dark pixels are arranged in an outer side of the block.

An example of the nonlinear oversampling will now be described together with a comparative example with reference to FIG. 17.

At the first stage of the two-dimensional modulation based on the nonlinear oversampling, the information data before the modulation is partitioned in 6 bits. At a second stage of the modulation, the one-dimensional data of 6 bits is modulated into two-dimensional data (per one block) of 3×3=9 pixels (9 bits).

As a rule for the modulation, the number of light pixels in one block is set as 3 pixels. Combinations of $2^6$=64 are selected in advance from among the combinations for selecting 3 pixels from among 9 pixels, that is, 9C3=9×8×7/(3×2) =84 combinations. Therefore, the information data of 6 bits is converted into the modulated data of 9 bits (6:9 modulations). Here, the number of pixels before the modulation becomes 3×3=9 pixels. One pixel after the modulation is normally multiplied into 2×2=4 pixels. The following (1) to (3) are the basic rules in the nonlinear oversampling.

(1) One pixel is increased to 4 pixels arranged in 2×2 matrix.

(2) One dark pixel is increased to 4 dark pixels which are simply arranged in 2×2 matrix.

(3) On the other hand, one light pixel is increased to 4 pixels in which 2 dark pixels and the 2 light pixels are combined with each other.

Figure 17:
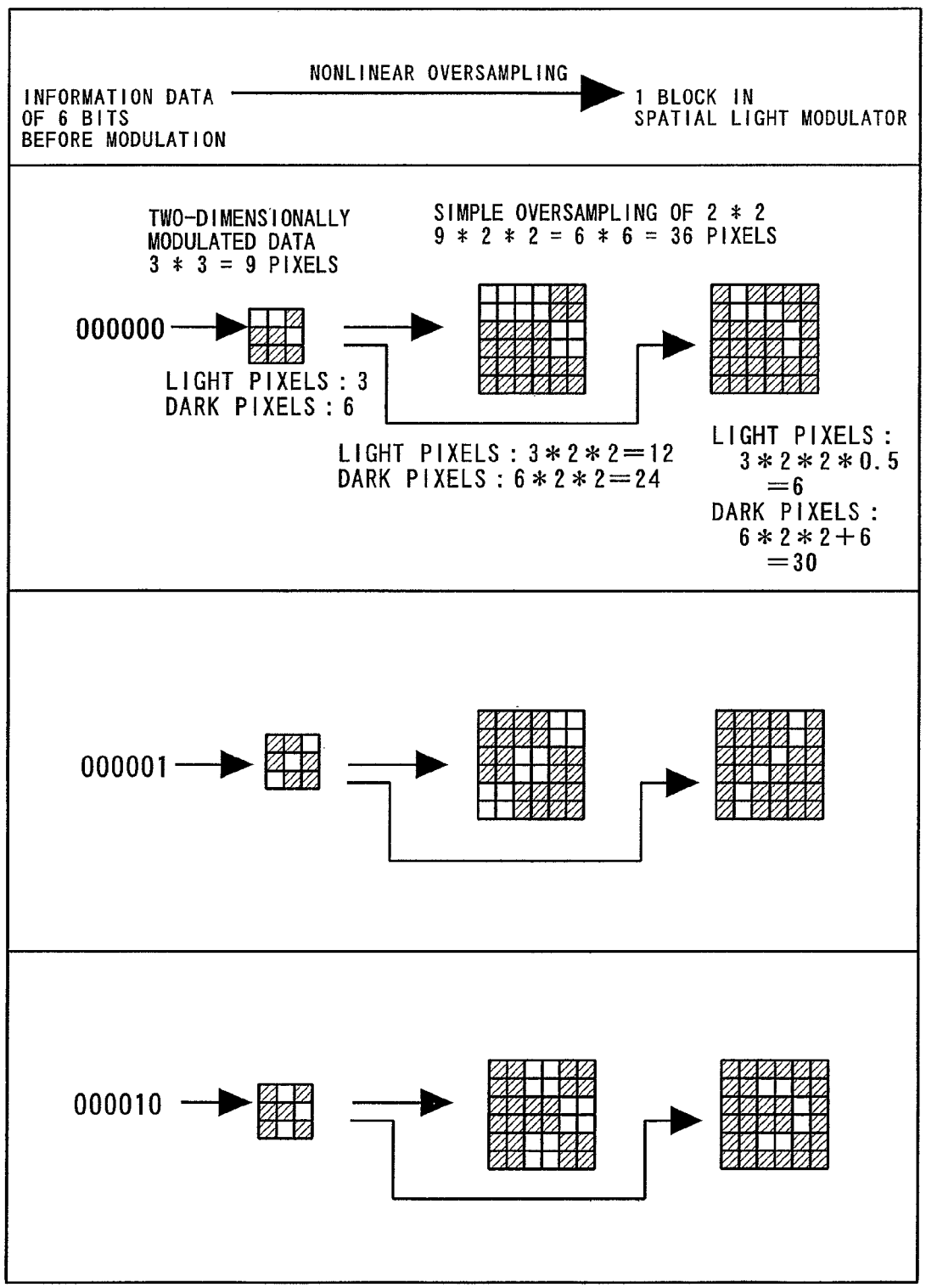
FIG. 17 is a diagram showing a part of a table for explaining two-dimensional modulation for recording information in the hologram recording carrier of another embodiment mode of the present invention.

As shown in FIG. 17, the number of pixels after the nonlinear oversampling becomes 9×4=36 pixels per one block. FIG. 17 shows both the simple oversampling (in the center in the figure) as the comparative example, and the nonlinear oversampling of this embodiment mode. In the simple oversampling, one dark pixel and one light pixel before oversampling are normally multiplied to 4 dark pixels and 4 light pixels, respectively. On the other hand, in the nonlinear oversampling of this embodiment mode, although one dark pixel is simply oversampled to 4 dark pixels, one light pixel is nonlinearly modulated into 2 dark pixels and 2 light pixels. Therefore, the number of light pixels per one block after the modulation in the simple oversampling becomes different from that in the nonlinear oversampling of this embodiment mode. Specifically, in the simple oversampling, 12 pixels out of 36 pixels are light pixels while in the nonlinear oversampling of this embodiment mode, 6 pixels out of 36 pixels are light pixels. Thus, the number of light pixels per one block is halved.

FIG. 18 shows the case where certain information data is two-dimensionally modulated into 9 pixels arranged in 3×3 matrix, and also shows the case where central pixels (the pixels excluding those in the four corners and the one in the inside of each block) of the outer sides in 9 pixels of each block are light pixels. In this case, the nonlinear oversampling is performed so that 2 light pixels are brought near to the center of the blocks of 6×6 as a center. Even in a state where the same 4 blocks are displayed on the spatial light modulator, the stripe-like dark pixels are provided between the blocks. As a result, the crosstalk between the blocks is reduced, and the boundary between the blocks is made clear.

Figure 19:
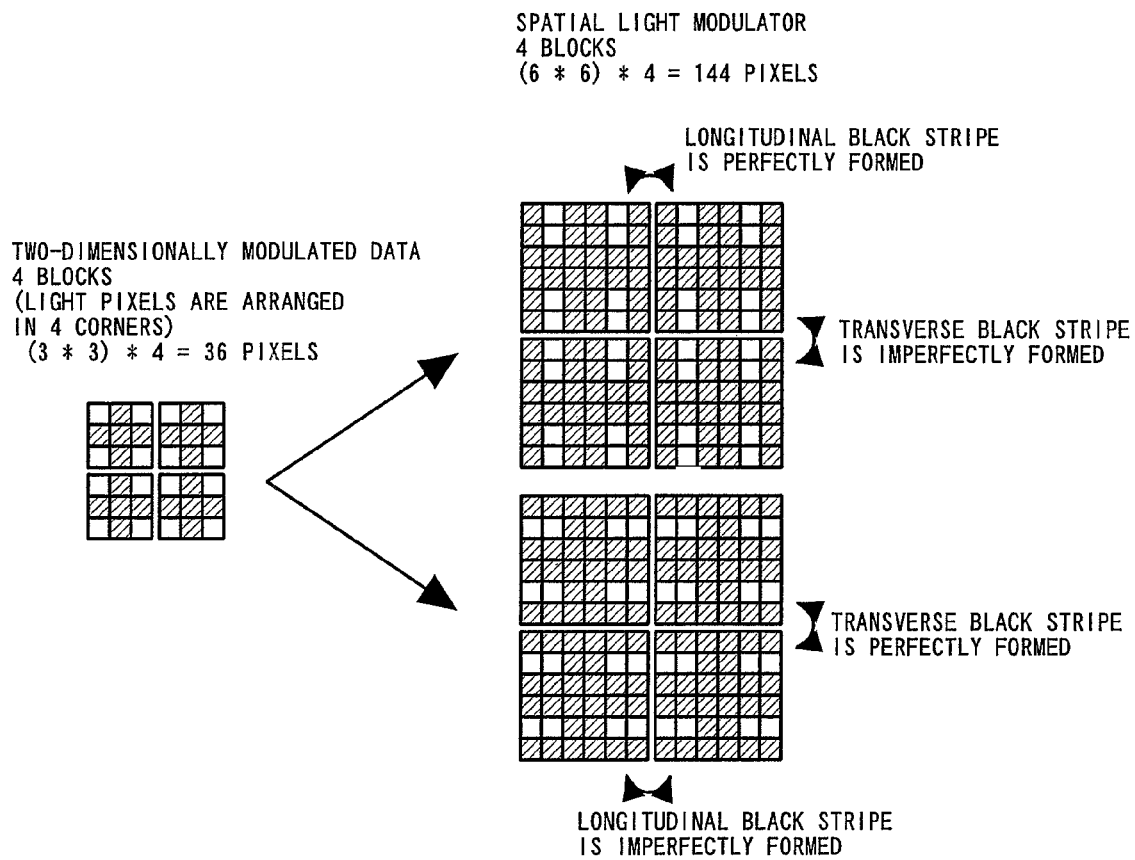

FIG. 19 shows the case where certain information data is two-dimensionally modulated into 9 pixels arranged in 3×3 matrix, and where the light pixels are located in the four corners of each blocks of 9 pixels, respectively. In this case, the nonlinear oversampling is performed so that 2 light pixels are brought near to the center of the longitudinal or transverse line pixels in the 6×6 blocks. In a state where the same 4 blocks are displayed on the spatial light modulator, the stripe-like dark pixels are longitudinally or transversely provided between the blocks. As a result, crosstalks between longitudinal blocks or transverse blocks is reduced, and the boundary between blocks is made clear.

Figure 20:
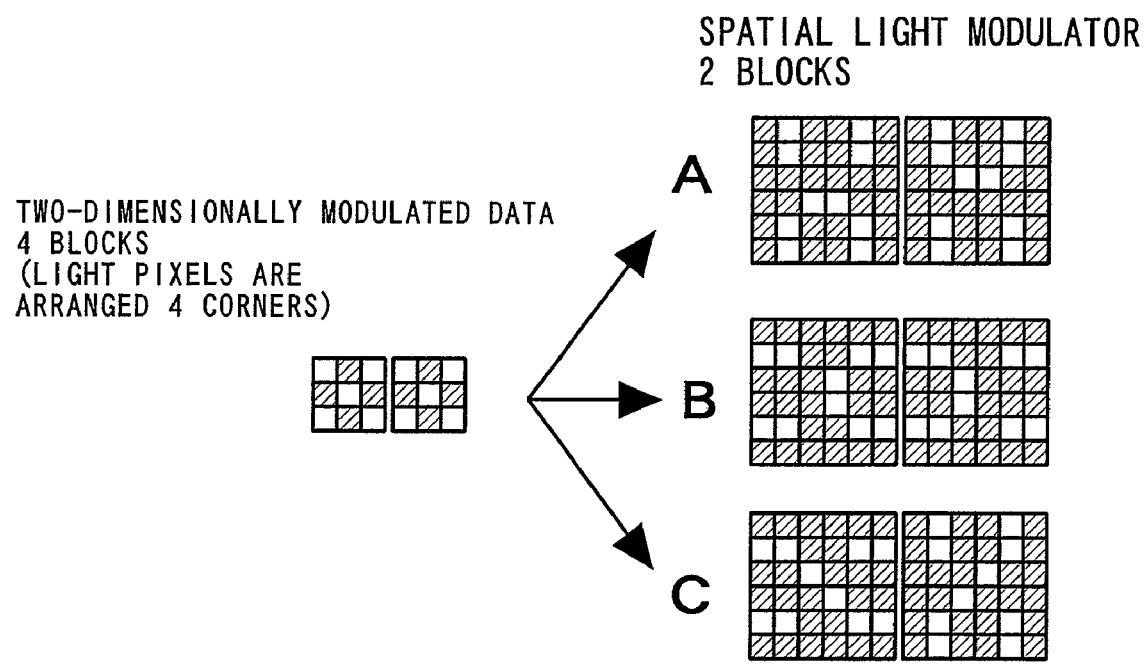

FIG. 20 shows the case where light pixels are located in the four corners of each block, similarly to the above case, and also shows the situation in which nonlinear oversampling is performed so that outer sides of each block (a portion contacting other blocks adjacent thereto) have dark pixels. Several cases are considered where the light pixels are located in the four corners of each block.

In the method of FIG. 20(A) considering that the longitudinal stripe formation (boundary portion BD) of the dark pixels is important, in order to clarify the difference from the four-corner pixels to obtain an intercode distance, the longitudinal light pixel arrangement is provided for the four corners of the block.

In the method of FIG. 20(B) considering that the transverse stripe formation (boundary portion BD) of the dark pixels is important, in order to clarify the difference from the four-corner pixels to obtain an intercode distance, the transverse light pixel arrangement is provided for the four corners of the block.

In a method of FIG. 20(C) considering that both the longitudinal and transverse stripe formations (boundary portion BD) are equally important, in order to further enhance distinction from the four corners and centers of respective sides, an oblique light pixel pattern is formed at the center of the block, the oblique direction is changed with values or the like of MSB (most significant bits) or LSB (least significant bits) before the modulation, and thus appearance probabilities in leftward inclination and rightward inclination are made nearly equal to each other.

Figure 21:
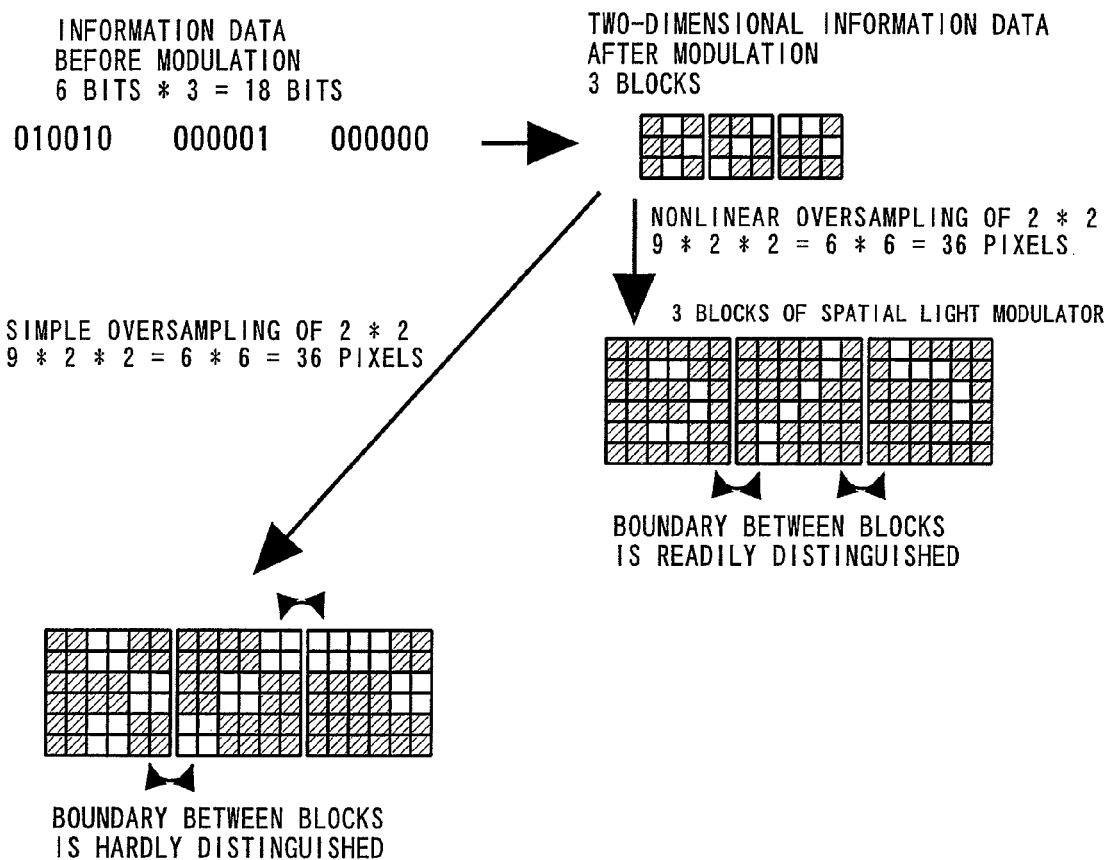

FIG. 21 shows the case where the information data of 6 bits, for example, (010010) (000001) (000000) is nonlinearly oversampled to 9 bits (9 pixels per one block) arranged in matrix together with a comparative example (simple oversampling). As shown in the figure, in the simple oversampling, the boundary between the blocks is hardly recognized. However, in this embodiment mode, the boundary between the blocks is readily distinguished.

Although the above-mentioned embodiment modes has been described by using the example in which 6 pixels are modulated into 3×3=9 pixels in the 6:9 modulation, and the example in which 3 light pixels are arranged in one block has been shown, the number of light pixels in one block may be 4 or 2. In addition, after the modulation, 4×4=18 pixels may constitute one block. It is acceptable as long as N pieces of bits are converted into a block in which m pixels are two-dimensionally arranged.

In addition, while the above examples are those where the data to be recorded is quantized into the binary (light pixels and dark pixels). However, in addition to the binary, there is an example of study of a ternary modulation by using light pixels, dark pixels and gray pixels in a literature of Brian M, King, Gaoffrey W., Burr, and Mark A, Neifeld "Experimental demonstration of gray-scale sparse modulation codes in volume holographic storage", APPLIED OPTICS Vol. 42, No 14/10 May 2003 pp. 2546 to 2559. This embodiment mode is also effective in the modulation in the ternary as described in the above literature.

This embodiment mode can be utilized in a system in which when the blocks which are two-dimensionally modulated are connected to each other to obtain the modulation pixels for one page which are spatially modulated, the probability of modulating the boundary between the blocks by using dark pixels is increased, whereby the pixels which are quantized into the binary (light pixels and dark pixels) or the ternary (light pixels, gray pixels and dark pixels) are two-dimensionally modulated, recorded and demodulated at the time of reconstruction, for example, a holographic data storage system for recording/reproducing an interference pattern between object light and reference light.

The invention claimed is:

1. A hologram apparatus comprising
a spatial light modulator having a plurality of pixels two-dimensionally arranged therein and irradiating coherent light containing therein page data to be recorded on a hologram recording carrier through said spatial light modulator to record information with an optical interference pattern generated by the coherent light as a diffraction grating, wherein said spatial light modulator comprises a plurality of blocks consisting of m pixels (where m=an integral number) adjacent to each other, and a boundary portion which is provided between the adjacent blocks and has a width having at least the width of one pixel of said spatial light modulator or of one pixel of an image detecting sensor used to reproduce the recorded page data and the distance between the adjacent pixels in each of said blocks, and which shield light; and an encoder for driving said spatial light modulator so as to display a plurality of continuous pixels in a light shielding state as said boundary portion, wherein said encoder groups data to be recorded into blocks per n bits (where n<m, and n=an integral number);

wherein said encoder generates page data by carrying out two-dimensional modulation for allocating m bit data to each block per n bits by referring to a modulation table;

wherein said encoder drives said spatial light modulator according to the resulting page data; and wherein said encoder adds boundary portion data for said boundary portion to each of said blocks when generating the page data.

2. The hologram apparatus according to claim 1, wherein said encoder generates page data for a boundary portion with which said boundary portion is provided, and drives said spatial light modulator so that the page data for a boundary portion and two-dimensionally modulated data are superimposed on each other.

3. The hologram apparatus according to claim 1, wherein said encoder drives said spatial light modulator so that each of said pixels of said spatial light modulator is constituted by a plurality of sub-pixels, and for the pixel which should shield light, all the sub-pixels of the pixel concerned are made in a light shielding state, and for the pixel which should transmit light, a part of the sub-pixels of the pixel concerned is made in a light shielding state, and the remaining sub-pixels are made in a light transmitting state, and when the pixel which should transmit light is adjacent to said adjacent blocks, said sub-pixels of the pixel concerned in the light shielding state are arranged between the adjacent blocks so as to constitute a part of said boundary portion.

4. The hologram apparatus according to claim 1, wherein said boundary portion is formed in advance as a light shielding portion of said spatial light modulator.

5. The hologram apparatus according to claim 4, wherein at least a part of a driving circuit of said spatial light modulator is disposed in said light shielding portion, which is formed in advance, of said spatial light modulator.

* * * * *